(12) United States Patent
McKinney

(10) Patent No.: US 7,314,546 B2
(45) Date of Patent: Jan. 1, 2008

(54) DISINFECTANT SYSTEM AND METHOD FOR THE CHEMICAL TREATMENT OF WASTEWATER

(75) Inventor: Jerry L. McKinney, Lumberton, TX (US)

(73) Assignee: Jerry L. McKinney 2002 Trust, Silsbee, TX (US)

( * ) Notice: Subject to any disclaimer, the term of this patent is extended or adjusted under 35 U.S.C. 154(b) by 439 days.

(21) Appl. No.: 10/866,351

(22) Filed: Jun. 11, 2004

(65) Prior Publication Data

US 2005/0274656 A1    Dec. 15, 2005

(51) Int. Cl.
*C02F 1/68* (2006.01)
(52) U.S. Cl. .................. 210/85; 210/138; 210/139; 210/143; 210/104; 210/198.1
(58) Field of Classification Search ................ 210/85, 210/138, 139, 104, 198.1, 143
See application file for complete search history.

(56) References Cited

U.S. PATENT DOCUMENTS

| | | | |
|---|---|---|---|
| 3,920,550 A * | 11/1975 | Farrell et al. ................. 210/86 |
| 3,996,139 A | 12/1976 | Prince et al. | |
| 4,019,983 A | 4/1977 | Mandt | |
| 4,381,240 A * | 4/1983 | Russell ...................... 210/746 |
| 4,874,002 A | 10/1989 | Sundholm | |
| 4,999,114 A * | 3/1991 | Choo ......................... 210/709 |
| 5,792,342 A * | 8/1998 | Heller et al. ............... 210/96.1 |
| 6,627,071 B1 | 9/2003 | Braden | |
| 2003/0155311 A1 | 8/2003 | Chaffin | |
| 2005/0242044 A1* | 11/2005 | Couch ........................ 210/744 |

FOREIGN PATENT DOCUMENTS

WO    WO 00/15322    3/2000

* cited by examiner

*Primary Examiner*—Terry K Cecil
(74) *Attorney, Agent, or Firm*—Browning Bushman P.C.

(57) ABSTRACT

A system for the chemical treatment of wastewater may be discharged in a night spray system, an on demand system or a dosing system. Tank 12 receives wastewater, and a discharge pump 16 pumps wastewater from the tank in the night spray system. A sensor 24 deactivates the discharge pump when the wastewater level reaches a predetermined low level, and in some applications activates the discharge pump when the wastewater level reaches a predetermined high level. A liquid disinfectant pump 38 pumps liquid disinfectant to the tank, and a controller 30 activates a liquid disinfectant pump for a selected time interval as a function of the discharge system.

8 Claims, 5 Drawing Sheets

DISINFECTANT SYSTEM AND METHOD FOR THE CHEMICAL TREATMENT OF WASTEWATER

FIELD OF THE INVENTION

The present invention relates to techniques for the chemical treatment of wastewater from an upstream aerobic treatment tank, sand filter unit, or other initial treatment or filtration unit. More particularly, the invention relates to an improved system for activating a liquid disinfectant pump to better accommodate the particular wastewater discharge system from the treated wastewater pump tank.

BACKGROUND OF THE INVENTION

There are various commercially available systems for the treatment of wastewater pumped from homes and small business. Most systems include an aerobic treatment tank and a clarifier tank, which may be separate from the aerobic treatment tank or within the aerobic treatment tank. Examples of prior art sewage treatment systems are disclosed in U.S. Pat. No. 4,874,002 wherein a clarifier chamber is centrally disposed within the treatment tank, and publication WO 00/15322, wherein a clarifier compartment is similarly disposed within an aeration compartment.

Downstream from the aerobic treatment tank and the clarifier tank, conventional systems employ a disinfectant tank for the final treatment of the wastewater before it is discharged to the environment. The disinfectant system typically includes a holding tank for receiving the wastewater and a discharge pump which may be activated to discharge the treated water from the tank in a variety of ways.

Regardless of the method by which the wastewater is finally discharged, most State and Federal regulations require that the water to be discharged be disinfected to eliminate or at least reduce the bacteria to an acceptable level. For this purpose, it has been common to use chlorinators, particularly chlorinators using tablets or other forms of solid, chlorine generating materials. It is also known to use liquid chlorinators wherein an amount of a liquid chlorine containing composition is injected into the clarified (treated) wastewater.

Typically liquid chlorinators have relied on the use of venturis or venturis-like pumps (venturi systems) to draw the liquid chlorine composition from a storage system into wastewater passing through the venturi system. An inherent problem with these venturi systems is that the wastewater passing there through is generally not totally free of solids. Since typically the nozzles of venturi systems have small diameter openings, there is a likelihood of plugging of the venturi with a concomitant disabling of the liquid chlorine composition infusion system. Examples of typical liquid chlorinators or liquid disinfectant systems employing the aspirating phenomena of venturi systems include U.S. Pat. Nos. 3,996,139; 4,019,983; and 6,627,071. U.S. 2003/0155311 also discloses a system in which liquid chlorine is supplied to a treatment tank due to a venturi effect.

The successful treatment of wastewater with a disinfectant depends on three primary criteria:

(1) the amount of disinfectant added, (2) the effective mixing of the disinfectant with the wastewater, and (3) the residence time of the disinfectant in the wastewater.

With respect to the latter item, chlorine as an example obviously needs some period of time to serve its disinfectant roll in the wastewater, but as the residence time of chlorine, and virtually all the disinfectants, in the wastewater increases beyond several hours, the chlorine tends to lose its effectiveness.

There are various difficulties associated with the operation and maintenance of prior art chlorination systems. In addition to the plugging problems discussed above, venturi systems do not always add the desired amount of liquid disinfectant to the tank, and disinfectant is not added at the most desirable times.

Prior art systems for discharging wastewater from the tank which receives and holds the treated wastewater can include a night spray system, an on-demand system, and a dosing system. In the night spray system, discharged wastewater is sprayed into the air during the evening hours generally after 12:00 a.m., and solid tablet disinfectant is commonly added to the system at various times during the day, as a function of incoming water to the pump tank. Solid tablet disinfectants are commonly not favored by homeowners or small businesses, since handling the tablets can be time consuming, and tablets are expensive and have a limited distribution. In a venturi system, a liquid disinfectant is added while pumping wastewater to the environment. One problem is that each night spray system is commonly required by regulating permits to have a periodic, disinfectant residual test, and this test is commonly performed by a certified state licensed maintenance person during daylight hours. As a consequence, a night spray system with a venturi for adding disinfectant may show a low chlorine residual test at 2:00 p.m., although a residual test performed at 1:30 a.m. at night may be satisfactory. As a consequence, there is no assurance that the chlorine residual test accurately-reflects-the residual status of the chlorine in the system during most time periods.

In an on-demand system, wastewater is discharged from the pump or holding tank when the float reaches a selected high value, and discharge continues until the float drops to a selected low value. Disinfectant may be added in a venturi system when the wastewater pump is activated. These systems are inherently ineffective, since the residence time of the disinfectant in the tank may be too short.

The third type of system for discharging wastewater from a pump tank is a dosing system, which may include a drip irrigation system. In this type of system, the discharge pump is cycled briefly in response to a high water level in the tank, and then the pump is deactivated by a timer for a relatively longer period of time, thereby allowing the pumped wastewater to dissipate into the soil through the drip irrigation system. The discharge pump is repeatedly cycled on for a brief period then off for a longer period until the float reaches a low water level, at which point the pump is deactivated. With this type of system, liquid chlorine disinfectant has been added in response to the venturi effect when the discharge pump is cycled on. This procedure creates an inefficiency since at least some of the added chlorine has a very short residence time in the tank before being discharged with the wastewater.

The disadvantages of the prior art are overcome by the present invention, and an improved system for the chemical treatment of wastewater discharged from a pump tank is hereinafter disclosed.

SUMMARY OF THE INVENTION

In one preferred embodiment, a system for the chemical treatment of wastewater discharged in a night spray system comprises a tank for receiving and holding wastewater, a discharge pump for pumping wastewater each day from the tank to the night spray system, and a sensor, e.g. a float, for deactivating the discharge pump when the wastewater level in the tank reaches a predetermined low level. A liquid disinfectant pump is provided for pumping a liquid disinfectant to the tank, and a controller activates the liquid disinfectant pump at selected times after a substantial delay, e.g., four hours, after the pump is first activated or reactivated each day, or after the pump is first deactivated or subsequently deactivated each day, or when the float reaches a predetermined low level.

In another preferred embodiment, a system for the chemical treatment of wastewater discharged in an on-demand system that includes a tank and discharge pump as discussed above, and a sensor, e.g. a float, for sensing the level of the wastewater in the tank and for activating the liquid discharge pump when the wastewater level rises to a selected high value, and for deactivating a discharge pump when the wastewater drops to a selected low value. A liquid disinfectant pump is provided for pumping a liquid disinfectant to the tank, and a controller activates the liquid disinfectant pump for a desired time period, e.g., 30 minutes, prior to first activating the discharge pump.

In yet another embodiment, a system for the chemical treatment of wastewater discharged in a dosing system includes a tank and a discharge pump for repeatedly pumping wastewater from the tank, e.g., to a drip irrigation system. A sensor, e.g. a float, senses the level of the wastewater in the tank and deactivates the discharge pump when the water level reaches a selected low value. The discharge pump may be activated for a selected time on period followed by a selected time off period, then reactivated for another time on period followed by a time off period. A chemical disinfectant pump is provided for inputting a liquid disinfectant to the tank. The controller may activate the chemical disinfectant pump for selected time periods each time the discharge pump is activated or deactivated.

In a preferred embodiment of the night spray discharge system there is provided a photocell for detecting a day or night condition, and a timer responsive to the photocell for activating the discharge pump a selected time after detecting the night condition.

As a further preferred feature of the invention, a liquid disinfectant volume valve is provided for controlling the flow rate of disinfectant from the liquid disinfectant pump to the tank. A return mixing pipe is preferably used for recycling to the pump tank a portion of the fluid pumped from the discharge pump. A low level sensor may be provided in a liquid disinfection storage tank, and the discharge pump deactivated in response to the low level sensor.

These and further features and advantages of the present invention will become apparent from the following detailed description, wherein reference is made to the figures in the accompanying drawings.

DETAILED DESCRIPTION OF THE PREFERRED EMBODIMENTS

The disinfection system of the present invention is directed to use with wastewater treatment systems, such as those referred to as "residential aerobic treatment systems," and is intended to encompass any small volume system capable of handling flow rates of less than about 5000 gallons per day, whether residential, commercial or small business. In preferred embodiments, the disinfection system of the invention is intended for use with a wastewater system having influent flow rates from about 500 to 1000 gallons per day. The raw sewage influent may be aerobically treated and disinfected before being discharged to a drain field, a spray system or as an effluent into a stream or the like.

The disinfection system of the present invention is directed towards disinfecting "treated water." As used here, treated water refers to water from which most of the solids have been removed via bacterial digestion of digestible solids under aerobic conditions, by a sand filter unit, or by another initial treatment or filtration unit.

Figure 1:
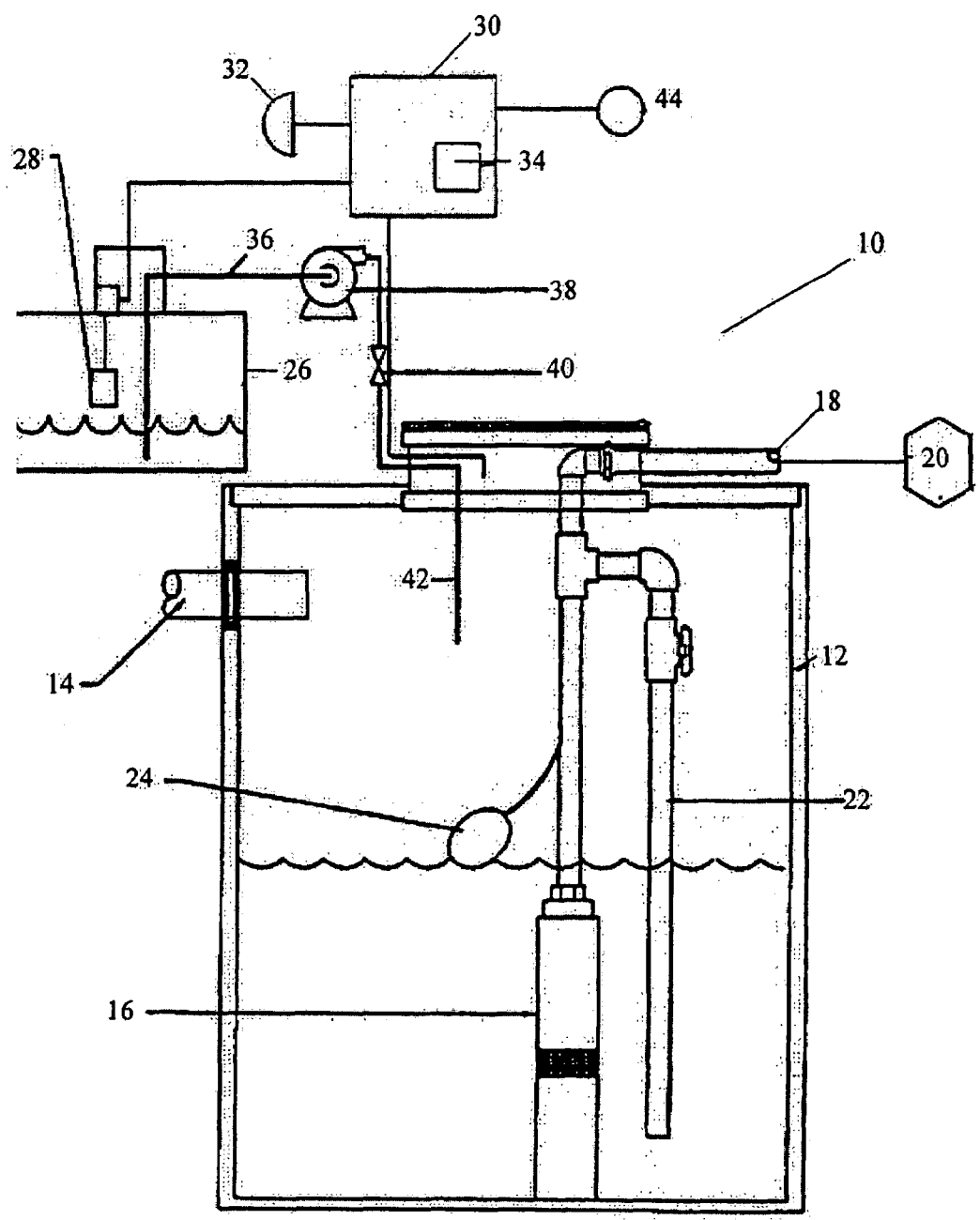
FIG. 1 is a simplified pictorial view of a system for the chemical treatment of wastewater discharged in a night spray system.

FIG. 1 discloses one embodiment of a night discharge liquid disinfectant system 10 according to the invention. A wastewater holding tank 12 receives effluent via line 14 from aerobic treatment tank (not shown). Discharge pump 16 within tank 18 pumps treated wastewater via line 18 to a night discharge system 20, which conventionally sprays the treated effluent into the air during night hours, typically from 12:00 a.m. to 4:00 a.m. A return mixing pipe 22 is provided for passing some of the pumped wastewater back to the tank 12 for better mixing of the wastewater. A sensor, such as float 24, senses the level of wastewater in the tank 12, and terminates operation of the pump 16 when the wastewater level drops below a selected low level, since the pump 16 could be damaged if operated below that level.

Liquid disinfectant is stored in tank 26, which contains a low level sensor 28. If liquid disinfectant in tank 26 drops below a selected low value, an alarm 32 may be activated, and the controller 30 may also prevent the discharge pump 16 from activating until liquid disinfectant is added to the tank 26. Liquid disinfectant is pumped via line 36 through the pump 38 and passed with the disinfectant volume valve 40, which may be regulated to control the volume of liquid disinfectant per unit of time passing to the tank 12 when the pump 38 is activated. Liquid disinfectant thus passes by the valve 40 and through input line 42 to the tank 12, thereby mixing with the wastewater in the tank.

Operation of the discharge pump 16 is regulated by controller 30, which includes a timer 34. A photocell 44 may be provided for sensing a day or night condition, with the timer 34 then being activated to first initiate a discharge of wastewater from the tank 12 in response to a selected time, e.g., 5 hours, after the nighttime condition is sensed. Photocell 44 may also deactivate the discharge pump to ensure that the treated effluent is not sprayed during daylight hours. Timer 34 may also regulate the on and off time for the pump 16 once the pump is activated, and in a suitable example may activate the pump 16 for 10 minutes, then deactivate the pump for 60 minutes, then reactivate the pump for another 10 minutes, etc., until the wastewater level drops to a selected low value, as indicated by the sensor 24. The controller 30 then deactivates the discharge pump 16 until the following night. Alternatively, a first timer could be initiated by activation or deactivation of the discharge pump after a selected time, e.g., from 2 to 4 hours, and a second timer used to control the on/off cycle for the disinfectant pump after being initially activated. In yet another embodiment, the controller may employ three or more timers, e.g., a first timer for controlling the on/off operation of the discharge pump, a second delay timer for initiating and terminating the operation of the liquid disinfectant pump, and a third timer for cycling the disinfectant pump on and off for a selected time period, typically during the day and early evening. The controller 30 may thus include one or more timers for serving the purpose of desired control for the activation of system components.

FIG. 1 indicates the controller 30 also operating the liquid disinfectant pump 38, with controller 30 optionally including another timer. If desired, the function of the controller and timer to operate the disinfectant pump 38 may be separated from the operation of controller 30 and timer 34 for the discharge pump 16. The controller 30 may sense the initial activation of the pump 16, and in response thereto reset the timer 48 to delay the activation of the liquid disinfectant pump 38 for a selected period of time, commonly for about four or five hours. This selected time delay is thus relatively long, and preferably is at least three hours after the initial activation of the discharge pump. Liquid disinfectant pump 38 may thus be initially activated at approximately 7:00 a.m. each day, which generally coincides with the time when wastewater from the house will begin entering the tank 12. A timer 34 may then control the activation of the pump 38, so that once the pump 38 is initially activated in the morning, the pump may be reactivated for relatively short periods of time, e.g., five minutes each hour or hour and a half. The controller 30 thus activates the disinfectant pump 38 for relatively short on-time periods each less than about 15 minutes, followed by relatively long off-time periods greater than about 45 minutes when the liquid disinfectant pump is inactive. The controller 30 with the timer 34 may then continue a selected on/off sequence for the time water flowing into the tank 12 is expected, e.g., until 10:30 p.m., at which time the controller 30 may deactivate the pump 38 until the next morning. The controller 30 thus deactivates the pump 38 less than 20 hours after the discharge pump 16 is initially or subsequently activated. The controller 30 may sense reactivation of the pump 16, and activate the pump 38 a selected time after a selected reactivation. In a similar manner, the controller 30 may sense deactivation of the pump 16, and control the pump 38 in response to the initial or subsequent deactivation of the pump 16.

In another embodiment of the night spray system, controller 30 may activate the chemical injection pump 38 a selected time interval after the discharge pump is deactivated. Once the daytime or nighttime condition is sensed and a timer initiates activation of the pump 16, the pump may be cycled on and off according to a preselected schedule until the float 24 indicates that the water in the tank 12 is at a preselected low level. Once this condition is obtained, the pump 16 is inactive until the following evening, but this condition may trigger a timer so that the liquid disinfectant pump 38 is activated, e.g., three hours after the discharge pump is deactivated. The controller 30 for the pump 38 may thereafter regulate in an on/off cycle during the day, as discussed above.

In yet another embodiment of the night spray system, the controller 30 activates a disinfectant pump 38 a selected time interval after the float indicates that the wastewater level has reached a predetermined low level. The float or sensor 24 reaching this level thus may trigger the timer so that the liquid disinfectant pump 38 is activated after a selected time period, the time period preferably commencing hours after the sensor 24 has provided the low water level signal. Once initially activated, the controller 30 may regulate pump 38 during on/off cycles the remainder of the day and evening, as discussed above.

While pump 34 can take many forms, an especially desirable pump is a diaphragm pump such as a miniature liquid diaphragm pump, SMF4 Series, Model 9141110 manufactured by Rietschle Thomas. Also, a peristaltic pump can be employed. These pumps are compact, highly reliable and inexpensive. FIG. 1 shows a throttle valve 40 for selectively restricting the fluid flow rate from the pump 38 to tank 12. The time for activating the pump 38 may be controlled as a function of the flow rate of the pump 38 and the throttle valve setting, so that the desired amount of liquid disinfectant is added to the system.

It should be understood that adding more disinfectant than necessary is undesirable, both from the standpoint of the cost of the excess liquid chemical used, and possible environmental consequences of discharging excess liquid chemical from the tank 12. Also, it is preferred for the night spray application that liquid chemical be added repeatedly in regular intervals during the day, e.g., every 45 minutes, so that additional chemical is repeatedly added to treat incoming wastewater. A low flow volume disinfectant pump outputs less than about 50 milliliters per minute and preferably about 25 milliliters per minute or less. The pump 38 may be activated for a relatively short period of time, e.g., 30 seconds or less, every 45 minutes, thereby inputting the necessary amount of liquid disinfectant without adding excess disinfectant.

Figure 2:
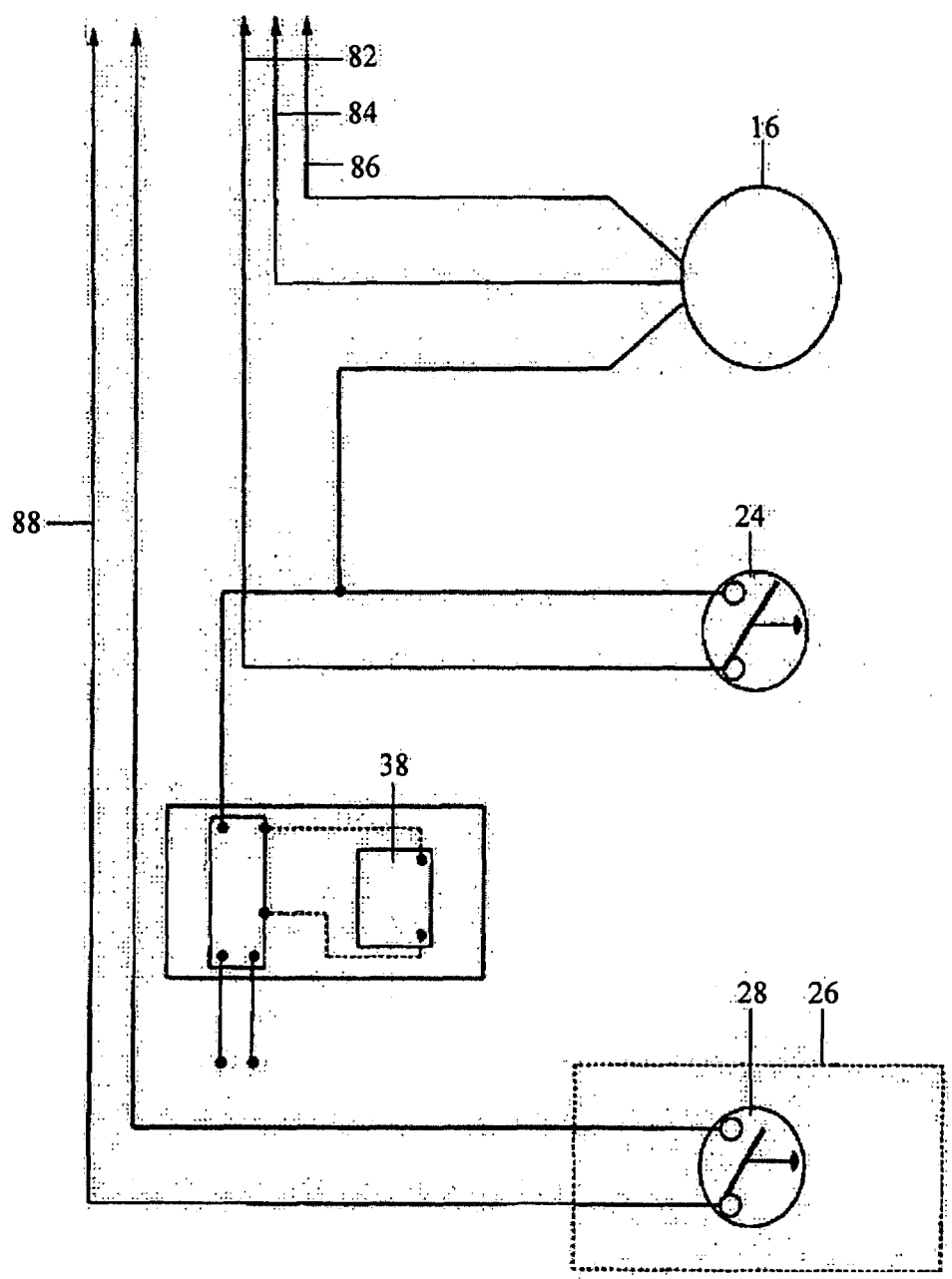
FIG. 2 is a circuit diagram for the system as shown in FIG. 1.

FIG. 2 illustrates a simplified schematic design for the system as shown in FIG. 1, including hot line 82, a neutral line 84 and a ground line 86 connected to the discharge pump 16. Provided that the float 24 is not at the low water level, power is thus available to activate the pump 16 in response to the controller 30, which is not depicted in FIG. 2. When the discharge pump 16 is initially activated at night, a reset signal is passed to the controller, which includes a timer as previously discussed, for activating the liquid discharge pump 38 after a selected delay of four to five hours. Alarm lines 88 connect the disinfectant low level flow 28 with the alarm 32.

Figure 3:
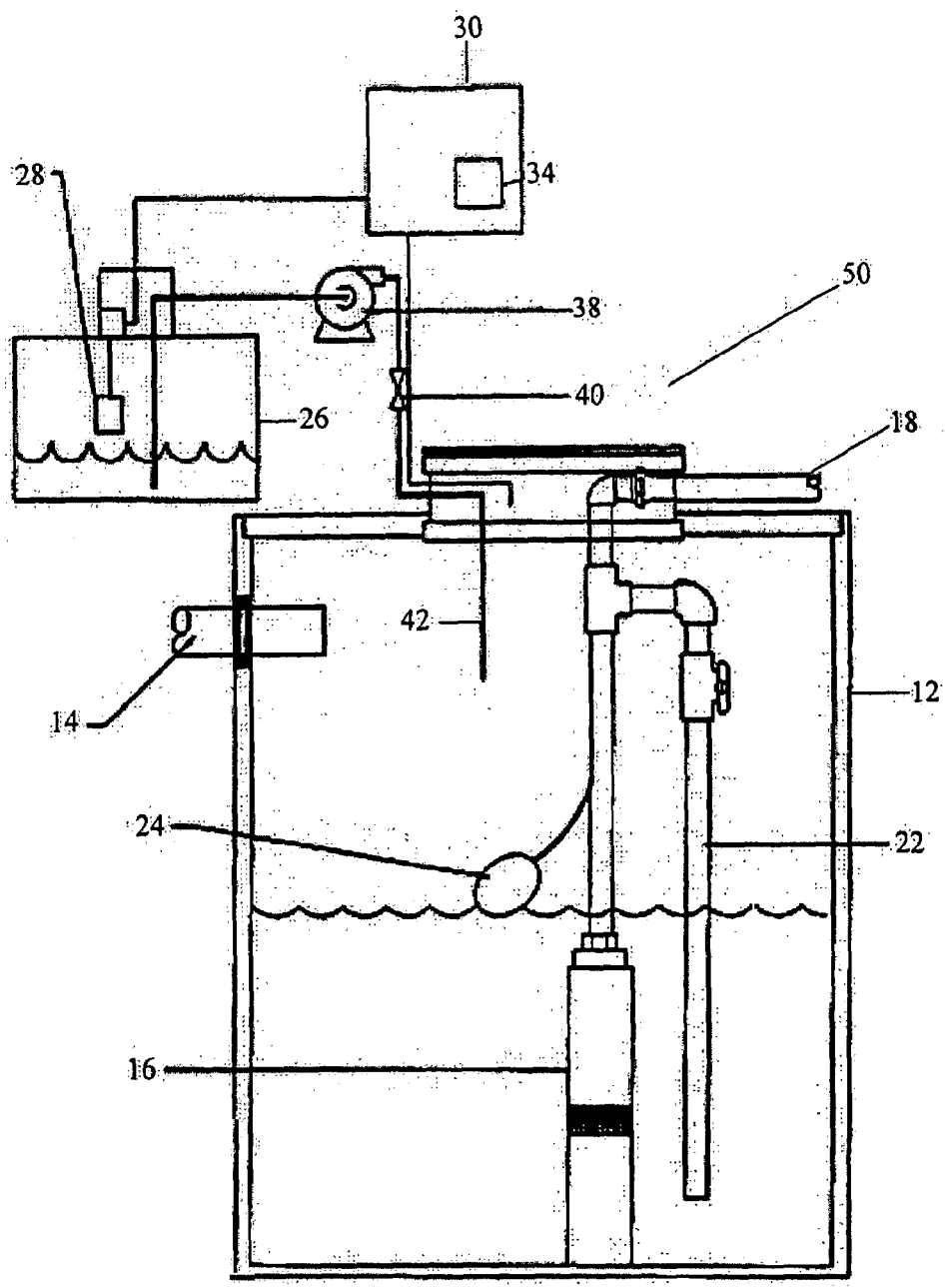
FIG. 3 is a simplified pictorial view of a system for the chemical treatment of wastewater discharged in an on-demand system.

FIG. 3 depicts a pump on the liquid disinfectant system 50 which contains components similar to the system 10 previously described. In this case, the pump 16 discharges wastewater to a disposal field when the control float 24 reaches a selected high value, and discontinues pumping when the control float 24 drops to a selected low value. In many operations, the pump 16 may be continuously activated when the sensor 24 indicates a water level until the selected wastewater low level is reached, although in other operations a delay could be provided after a selected time period, so that the pump 16 was repeatedly deactivated for a short period of time and then again reactivated until the float reached the low level. System 50 may also include a timer 34 as shown in FIG. 1, and an alarm 32 for sounding a warning if a liquid disinfectant drops below a selected low value.

In the on demand system of FIG. 3, liquid disinfectant is preferably added to the tank 12 for a selected time period, e.g., at least 20 minutes, and preferably less than two hour, before the discharge pump 16 is activated. This time period is sufficient for disinfectant to treat the wastewater while avoiding an overly long residence time. The disinfectant pump 38 may be activated in response to controller 30. The level for liquid in the tank 12 sensed by float or sensor 24 may be set slightly lower than otherwise desired, so that when sensor 24 reaches its selected high level, controller 30 activates disinfectant pump 38 to add disinfectant to the tank 12, while maintaining the pump 16 inactive. The disinfectant may be added for a selected period of, e.g., 10 or 15 minutes, after which time controller 30 may deactivate the liquid disinfectant pump 38 and start a selected time delay for another relatively short period of time, e.g., 20 minutes, after which time the discharge pump 16 may be activated. This procedure effectively results in the liquid chemical being added for a brief period before-pump 16 is activated, and this period is sufficient to treat the wastewater in the holding tank 22. During the addition of disinfectant and for the short time delay after disinfectant is added, the wastewater may come into the tank 12 through the line 14. Thus, when the discharge pump 16 is activated, the liquid level in the tank 12 may be slightly higher than the level set to initially activate the liquid disinfectant pump 38.

Figure 4:
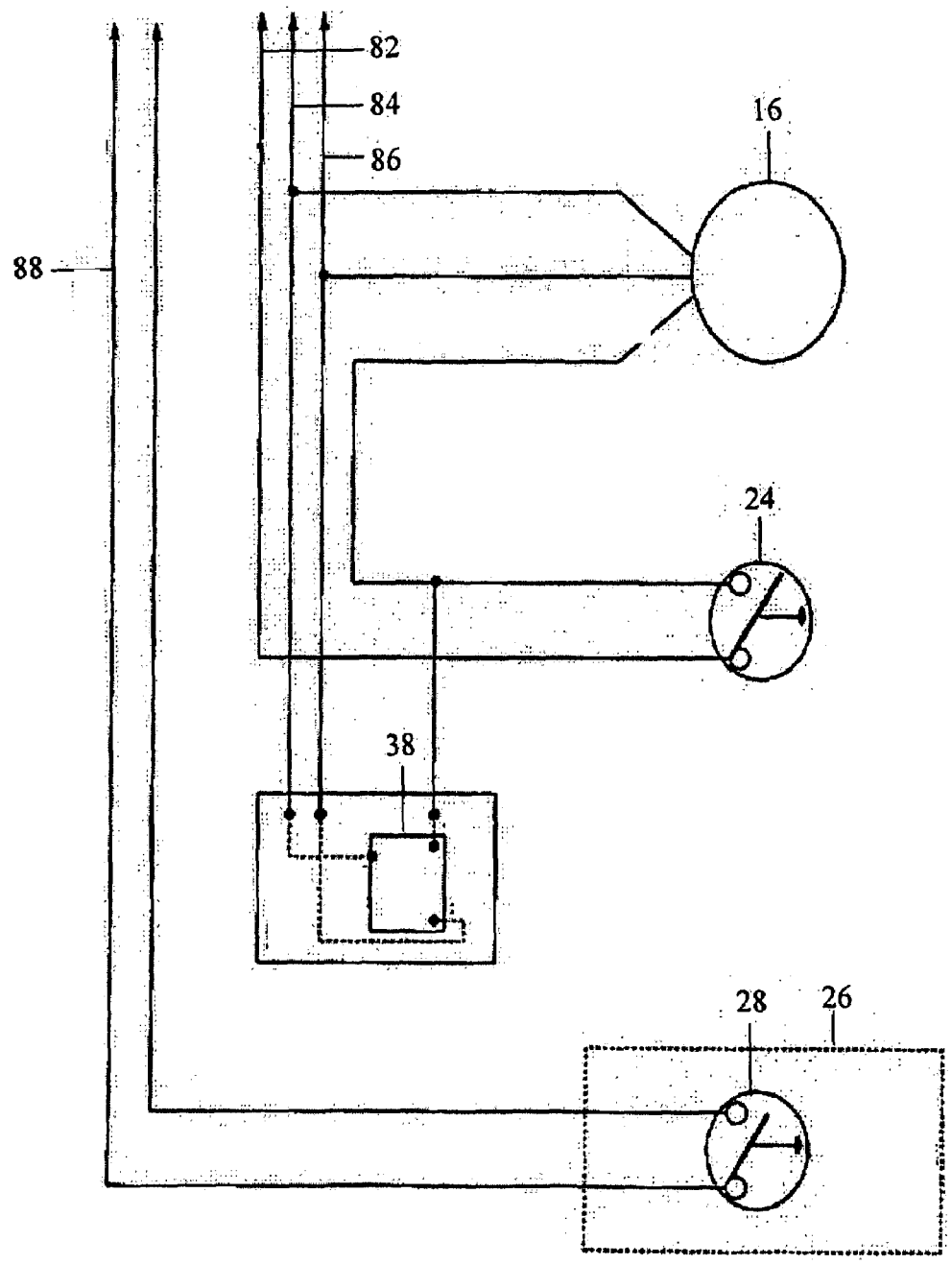
FIG. 4 is a circuit diagram for the system as shown in FIG. 3 or 5.

FIG. 4 illustrates a portion of the control logic for the system as shown in FIG. 3, and is similar to the schematic shown in FIG. 2. For this embodiment, only a single timer 34 within the controller 30 is required to activate both the disinfectant pump 38 and the discharge pump 16. When the float 24 within the tank 12 reaches a selected high value, liquid discharge pump 38 may be activated. If desired, controller 46 may be used instead of controller 30 to regulate the time period that pump 38 is activated, and to set the desired delay period between activation of the liquid disinfectant pump 38 and the activation of the discharge pump 16.

Figure 5:
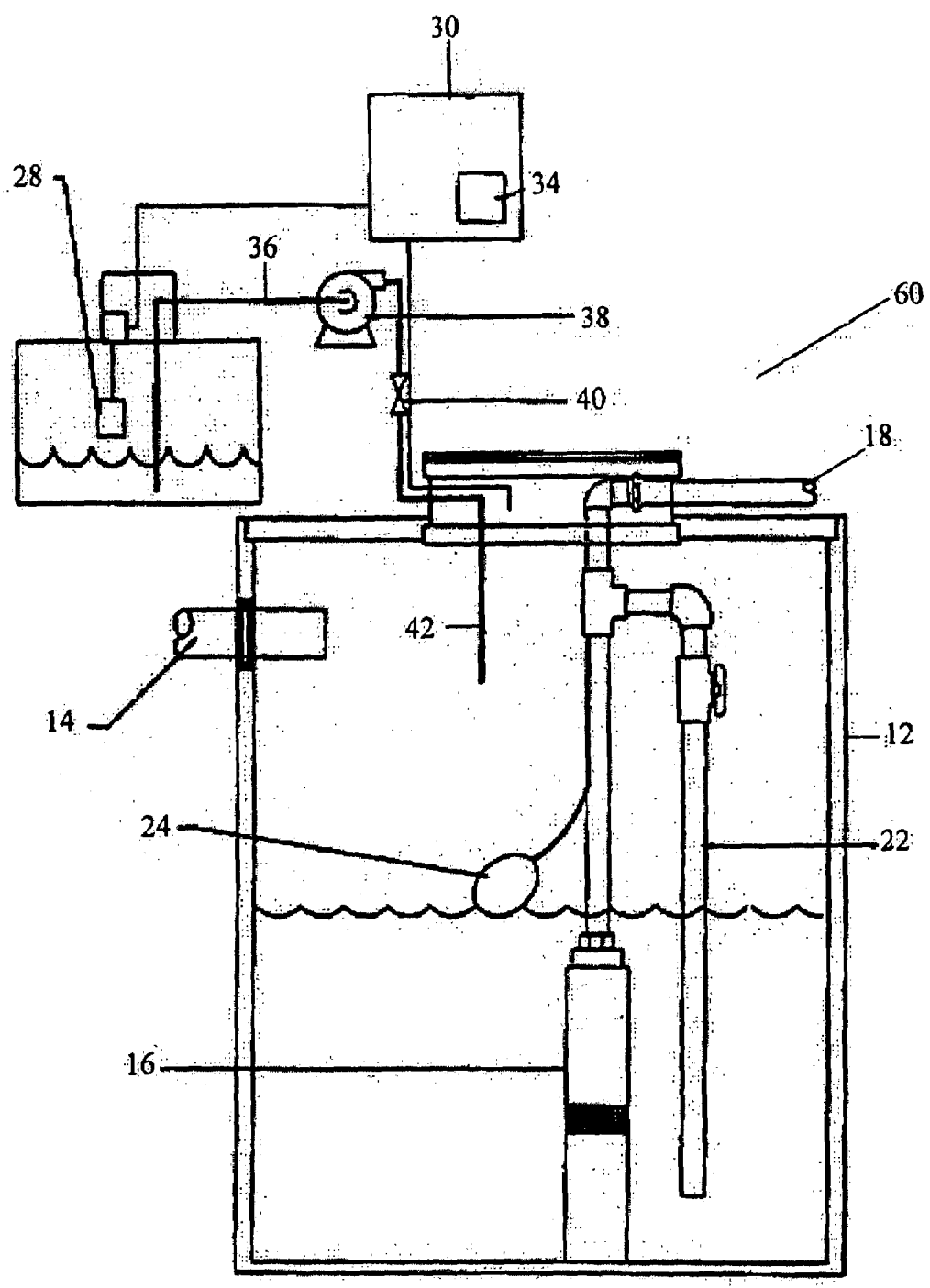
FIG. 5 is a simplified pictorial view of a system for the chemical treatment of wastewater discharged in a dosing system.

FIG. 5 illustrates a dosing system 60 according to one embodiment of the invention, with the system 60 also containing many of the components of the system 10. For both the system 50 as shown in FIG. 3 and the system 60 as shown in FIG. 5, components previously discussed with respect to the system 10 are not repeated in this discussion. For the dosing system, the liquid from the tank 12 is discharged through the line 18 to the dosing disposal system, which in one embodiment may be a drip irrigation system. Consistent with the characteristics of the dosing system, the pump 16 may be initially activated when the water level reaches a selected high level, and will be deactivated when the water level reaches a selected low level. Between these levels, the pump 16 conventionally is activated for a brief period of time, e.g., 15 minutes, and is then deactivated for a longer period of time, e.g., 45 minutes, thereby allowing the discharged liquid to soak into the ground before the pump is again reactivated. A substantial time period is thus typically required for the wastewater level to pump from a selected high level to a selected low level, particularly since additional wastewater is frequently entering the tank 12 through the line 14 during this period.

In a preferred embodiment, the controller 30 is used to operate the pump 38, and activate the liquid discharge pump 38 a selected time period, e.g., 10 minutes, starting with the period when the pump 16 is activated, or starting with the time period the pump 16 is deactivated. The period of activating the pump 38 need not be the same as the period for activating the pump 16. The pump 38 also need not be activated each time the discharge pump 16 is activated. While the discharge pump 16 may be activated for 15 minutes and then be off for 45 minutes, the liquid disinfectant pump 38 may be activated for one minute and then off for 59 minutes. A desired on time for the pump 38 may thus be selected, and is not dependent on the on time for the pump 16, but may be initiated by activation of pump 16. Also, the pump 38 may be activated during the same period the pump 16 is activated for simplicity of the controls, or pump 38 may be activated in response to the deactivation of the pump 16. As with the night discharge system previously discussed, a low volume pump 38 is preferably used for ensuring that liquid disinfectant is regularly added to the tank 12. The time the pump 38 is activated is controlled to reduce excess use of liquid disinfectant. Activation of the pump 38 for a brief period to pump a small volume of disinfectant, e.g., 0.5 to 5 milliliters, each time pump 38 is activated is highly desirable in view of the number of times each day that pump 16 is activated. The time for operating the pump 38 may be easily regulated in conjunction with the setting for the throttling valve 40 to control the quantity of disinfectant added.

The schematic diagram for the system 60 as shown in FIG. 5 will be similar to the system shown in FIG. 4. In the FIG. 5 application, the controller preferably repeatedly activates the liquid disinfectant pump 38 each time the discharge pump 16 is activated. The pump 16 is typically activated numerous times throughout the day for the liquid in tank 12 to be pumped from a selected high value to a selected low value.

The term liquid disinfectant, as used herein, is intended to mean any chemical composition which is in the liquid form, e.g., a gas, solid or other liquid which can be dissolved in an aqueous medium and which is commonly used for disinfecting water. Non-limiting examples of such compositions include aqueous solutions of chlorine, bromine, iodine, solutions of sodium hypochlorite, solutions of such other solid disinfectants which are soluble in water. Alternatively, the liquid disinfectant can be a non-aqueous liquid, e.g., bromine.

The term float and the term sensor as used in connection with the activation and deactivation of the discharge pump or the liquid disinfectant pump should be understood to include two or more sensors for achieving the same objective as the sensor discussed above, e.g., one sensor for activating the pump at a selected high fluid level, and another sensor for deactivating the pump at a selected low fluid level.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A system for the chemical treatment of wastewater discharged in a night spray system, comprising: a tank for receiving and holding wastewater;

a discharge pump for pumping wastewater once per day from the tank to the night spray system;

a sensor for deactivating the discharge pump when the wastewater level in the tank reaches a predetermined low level;

a photocell for detecting a day or night condition;

a timer responsive to the photocell for activating the discharge pump a selected time after detecting the day or night condition;

a liquid disinfectant pump for pumping a liquid disinfectant to the tank; and a controller for activating the liquid disinfectant pump after a selected time interval after the discharge pump is initially or subsequently activated, or after the discharge pump is initially or subsequently deactivated, or when the wastewater level reaches the predetermined low level.

2. A system as defined in claim 1, wherein the controller activates the liquid disinfectant pump after a selected time interval commencing at least three hours after the discharge pump is deactivated when the wastewater level reaches the predetermined low level.

3. A system as defined in claim 2, wherein the controller repeatedly activates the liquid disinfectant pump after the selected time interval for a relatively short time period of no more than about 10 minutes followed by a relatively long time period of greater than about 30 minutes of deactivation of the liquid disinfectant pump.

4. A system as defined in claim 2, wherein the controller activates the liquid disinfectant pump at selected time intervals terminating less than 20 hours after the discharge pump is initially activated.

5. A system as defined in claim 1, further comprising:

a liquid disinfectant storage tank;

a low level disinfectant sensor for detecting a low level condition in the liquid disinfectant storage tank; and the discharge pump being deactivated in response to a low level condition in the liquid disinfectant storage tank.

6. A system as defined in claim 5, further comprising:

an alarm responsive to the low level condition in the liquid disinfectant storage tank.

7. A system as defined in claim 1, further comprising:

a liquid disinfectant volume valve for controlling the flow rate of liquid disinfectant from the liquid disinfectant pump to the tank.

8. A system as defined in claim 1, further comprising:

a return mixing pipe for returning to the tank a portion of the fluid pumped from the discharge pump.

* * * * *